United States Patent
Basak et al.

(10) Patent No.: US 11,144,468 B2
(45) Date of Patent: Oct. 12, 2021

(54) HARDWARE BASED TECHNIQUE TO PREVENT CRITICAL FINE-GRAINED CACHE SIDE-CHANNEL ATTACKS

(71) Applicant: Intel Corporation, Santa Clara, CA (US)

(72) Inventors: Abhishek Basak, Hillsboro, OR (US); Arun Kanuparthi, Portland, OR (US); Nagaraju N. Kodalapura, Hillsboro, OR (US); Jason M. Fung, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/024,072

(22) Filed: Jun. 29, 2018

(65) Prior Publication Data
US 2019/0042453 A1 Feb. 7, 2019

(51) Int. Cl.
*G06F 12/0891* (2016.01)

(52) U.S. Cl.
CPC .. *G06F 12/0891* (2013.01); *G06F 2212/1024* (2013.01); *G06F 2212/281* (2013.01)

(58) Field of Classification Search
CPC ........... G06F 12/0891; G06F 2212/281; G06F 2212/1024; G06F 12/1408; G06F 2212/1052; G06F 12/128
See application file for complete search history.

(56) References Cited

U.S. PATENT DOCUMENTS

| | | | | |
|---|---|---|---|---|
| 9,436,603 | B1* | 9/2016 | Pohlack | G06F 21/556 |
| 2008/0109625 | A1* | 5/2008 | Erlingsson | G06F 12/0802 |
| | | | | 711/163 |
| 2008/0162816 | A1* | 7/2008 | Buxton | G06F 9/30047 |
| | | | | 711/118 |
| 2010/0180083 | A1* | 7/2010 | Lee | G06F 12/0846 |
| | | | | 711/128 |
| 2018/0032447 | A1* | 2/2018 | Kaplan | G06F 12/1009 |
| 2018/0046808 | A1* | 2/2018 | Cammarota | G06F 12/0877 |

(Continued)

OTHER PUBLICATIONS

Lipp, Moritz el al., Meltdown, 27th {USENIX} Security Symposium ({USENIX} Security 18), 2018, 16 pages.

(Continued)

*Primary Examiner* — Charles Rones
*Assistant Examiner* — Tong B. Vo
(74) *Attorney, Agent, or Firm* — Alliance IP, LLC (57) ABSTRACT

A system may include a processor and a memory, the processor having at least one cache. The cache may include a plurality of sets, each set having a plurality of cache lines. Each cache line may include several bits for storing information, including at least a "shared" bit to indicate whether the cache line is shared between different processes being executed by the processor. The example cache may also include shared cache line detection and eviction logic. During normal operation, the cache logic may monitor for a context switch (i.e., determine if the processor is switching from executing instructions for a first process to executing instructions for a second process). Upon a context switch, the cache logic may evict the shared cache lines (e.g., the cache lines with a shared bit of 1). This eviction of shared cache lines may prevent attackers utilizing such attacks from gleaning meaningful information.

25 Claims, 6 Drawing Sheets

(56) References Cited

U.S. PATENT DOCUMENTS

| | | | |
|---|---|---|---|
| 2018/0181491 A1* | 6/2018 | DeLaurier | G06F 12/0895 |
| 2018/0181498 A1* | 6/2018 | Makowski | G06F 21/51 |
| 2018/0300182 A1* | 10/2018 | Hwang | G06F 9/5077 |
| 2019/0114422 A1* | 4/2019 | Johnson | G06F 9/30043 |
| 2019/0303150 A1* | 10/2019 | Dechene | G06F 9/3818 |

OTHER PUBLICATIONS

Kocher, Paul, et al., Spectre Attacks: Exploiting Speculative Execution, 40th IEEE Symposium on Security and Privacy (S&P'19)2018, 19 pages.

* cited by examiner

HARDWARE BASED TECHNIQUE TO PREVENT CRITICAL FINE-GRAINED CACHE SIDE-CHANNEL ATTACKS

TECHNICAL FIELD

The present disclosure relates to systems and methods for preventing cache side-channel attacks.

BACKGROUND

Sharing of memory between applications or virtual machines (VMs) is commonplace in computer platforms as it leads to effective utilization of system memory and improves bandwidth requirements, overall system performance and energy/power profiles. This includes memory sections consisting of dynamic, shared libraries, memory mapped files and I/O, common data structures, code sections as well as kernel memory. However recent security research has shown that common shared memory can be advantageously utilized by adversaries to conduct fine-grain cache side-channel attacks and extract critical information, secrets etc.

Side-channel attacks gained widespread notoriety in early 2018. In general, a side-channel attack includes any attack based on information gained from the implementation of a computer system, rather than weaknesses in the implemented algorithm itself. Such side-channel attacks may use timing information, power consumption, electromagnetic leaks or even sound as an extra source of information that is exploited to obtain information and/or data from the system. For example, "FLUSH+RELOAD" and "FLUSH+FLUSH" are two common cache side-channel approaches used for information leakage (e.g. AES keys from S-Box look up table access, RSA keys from conditional branches of algorithm, database secrets from access patterns etc.) at a cache line granularity (64 B on IA). They are applicable in both x-86/64 and ARM based systems, the two most common CPU architectures.

As the names of these attacks suggest, their main operations include flushing of shared memory lines of interest by attacker software, allowing the victim program to execute for some time and consequently the attacker program checking which of those shared memory lines have been accessed by the victim through either reloading or flushing and measuring the time of accesses (differs significantly according to whether present in cache subsystem or not).

Many cache-timing side-channel attacks generally involve an attacker process detecting how other "victim" processes have influenced the cache, then interpreting the detected cache changes to determine information the attacker is not supposed to be able to access. As a non-limiting example, in order to detect changes that a victim process makes to the cache, an attacker sets the cache to a "blank" state, i.e., with all cache lines invalid. Alternatively, the attacker could repeatedly execute operations to fill every cache line of the entire cache with the attacker's data. The attacker stores data in a particular order to enable the attacker to keep track of which cache line any particular data is stored in. Thus, any subsequent memory access by any other process will result in changes to the cache (i.e., one or more cache lines containing the attacker's data will be evicted and written to).

Continuing with the same non-limiting example, after the victim process has executed for some time, the attacker performs read operations of all of the data it previously caused to be stored in the cache. While performing these read operations, the attacker times how long each read operation takes to complete. Most operations will be relatively fast (implying that the requested data was in the cache), but some will be significantly (e.g., 2 or more orders of magnitude) slower. The slower read operations correspond to data that was not in the cache. Since the attacker deliberately ensured that this data was stored in the cache before the victim process executed, the attacker is able to determine that the victim process caused this data to be evicted. Since the attacker stored the data in a particular order, the attacker is able to determine which cache lines were evicted. Based on this information, the attacker may be able to use any of several statistical analysis methods to determine secrets about the victim process. Some of these methods may require the attacker to know information about the victim process beforehand, e.g., that the victim process was a specific cryptographic algorithm.

With increased static and run time hardening of the underlying compute platforms with different security features, these shared-memory-based fine-grained cache side-channel leakages are becoming an important component of an attacker's arsenal. Datacenters and cloud computing platforms, where the main business model is services through efficient sharing of resources, are particularly reliant on shared memory and thus vulnerable to these (and similar) attacks. Currently, the benefits of shared memory from a computing efficiency perspective outweighs any of these potential shortcomings or mal-usages.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The systems and methods disclosed herein provide detection and mitigation of several different forms of cache-timing-based side-channel attacks. As a non-limiting example, a system consistent with the present disclosure may include a processor and a memory, the processor having at least one cache. The cache may include a plurality of sets, each set having a plurality of cache lines. Each cache line may include several bits for storing information, including at least a "shared" bit to indicate whether the cache line is shared between different processes being executed by the processor. The example cache may also include shared cache line detection and eviction logic. During normal operation, the cache logic may monitor for a context switch (i.e., determine if the processor is switching from executing instructions for a first process to executing instructions for a second process). Upon a context switch, the cache logic may evict the shared cache lines (e.g., the cache lines with a shared bit of 1). Due to the nature of cache-timing side-channel attacks, this eviction of shared cache lines may prevent attackers utilizing such attacks from gleaning meaningful information.

Figure 1:
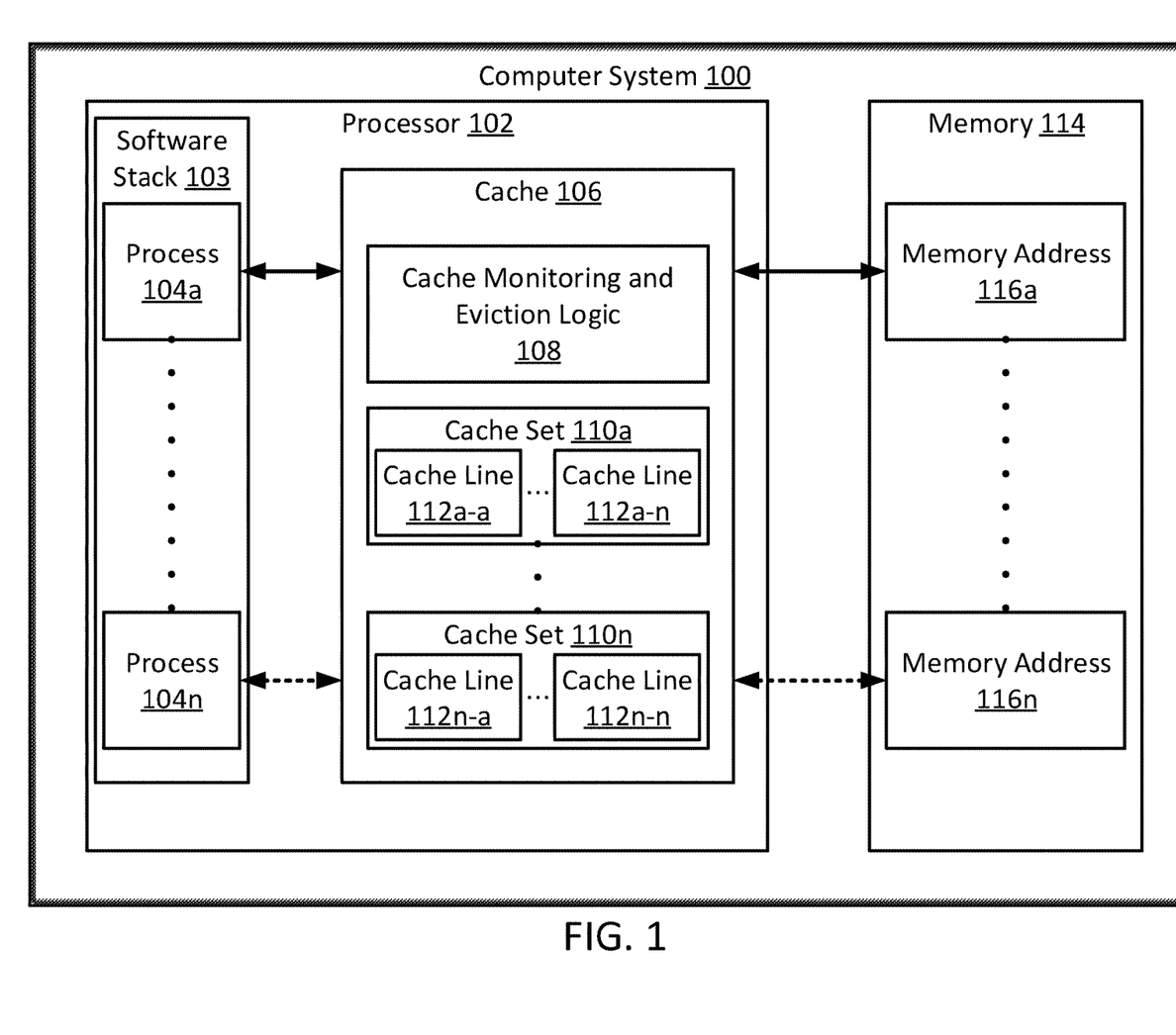
FIG. 1 illustrates an example computer system according to several embodiments of the present disclosure.

Throughout this disclosure, reference may be made to a "processor" (such as processor 102 in FIG. 1) or "cache" (such as cache 106 in FIG. 1). While many embodiments describe components of this disclosure being located in a single cache of a single processor, this is meant as a non-limiting example; in some embodiments, computer systems include a plurality of processors. Further, each processor may include multiple caches of different levels (e.g., L1 cache, L2 cache, L3 cache, last-level cache (LLC), etc.). Some or all of the systems or methods described herein may be implemented on one or more of a plurality of processors or their respective caches. For example, a computer system consistent with the present disclosure may include 2 processors, each with 3 levels of cache, each L3 cache having its own shared cache line detect and eviction logic.

Additionally, reference is made throughout this disclosure to a variety of "bits," often as status indicators for various components of the present disclosure. While reference may be made to certain bit values indicating certain statuses, (e.g., a validity bit of "1" may imply that a cache line is valid, while a validity bit of "0" may imply the cache line is invalid), this is meant as a non-limiting example; embodiments wherein different values imply the same status are fully considered herein. For example, a validity bit of "0" may instead imply that a cache line is valid, while a validity bit of "1" may imply that the cache line is invalid, etc.

FIG. 1 illustrates an example computer system 100 according to several embodiments of the present disclosure. The system 100 generally includes at least processor 102 and memory 114. System 100 may additionally include various common components of computer systems such as a power supply, network interface, etc., but these are not shown in FIG. 1 for simplicity. Processor 102 is configured to execute instructions associated with a plurality of processes 104a-104n (collectively "processes 104") included in a software stack 103. Software stack 103 also generally includes an operating system (OS) or virtual machine manager (VMM) of computer system 100. Memory 114 includes a plurality of memory addresses 116a-116n (collectively "memory addresses 116") configured to store information, instructions, etc. Processor 102 is generally configured to access the information stored in memory addresses 116a of memory 114, e.g., during the course of executing instructions associated with processes 104. In typical configurations, when information is accessed from one of memory addresses 116, processor 102 stores the information in cache 106.

Cache 106 includes cache monitoring and eviction logic 108 and a plurality of cache sets 110a-110n (collectively "sets 110"). Each cache set includes a plurality of cache lines 112 (e.g., cache set 110a includes cache lines 112a-a-112a-n, cache set 112n includes cache lines 112n-a-112n-n, etc.; collectively "cache lines 112"). Each cache line generally includes a sequence of bits, each bit conveying a particular meaning depending upon its value (e.g., "1" or "0") and its index in the sequence (e.g., a first bit may indicate a validity of the cache line, a second bit may indicate whether the cache line is shared, etc.), as will be described in further detail below.

When processor 102 reads information from a memory address 116, the processor stores or otherwise records the information in one of cache lines 112. Processor 102 may select one of cache lines 112 based on any of a plurality of cache replacement policies (e.g., first-in-first-out (FIFO), last-recently used (LRU), etc.) implemented in processor 102 (not shown in FIG. 1). When processor 102 stores information to a cache line, a "valid" bit is set to "1" to indicate that the line includes valid data.

Cache monitoring and eviction logic 108 ("cache logic 108") is generally configured to monitor, label and selectively evict cache lines based on whether or not they are "shared," e.g. whether or not more than one of processes 104 are capable of accessing them. For example, if a cache line 112a-a can only be written to or read by process 104a, then cache line 112a-a is not shared. However, if, for example, cache line 112a-n can be written to and read by both process 104a and process 104n, then cache line 112a-n is considered "shared." Cache logic 108 generally determines which cache lines are shared based on corresponding page table entries, as will be described in further detail below.

In general, cache logic 108 is configured to evict, wipe, flush, or otherwise invalidate cache lines. In some embodiments, cache logic 108 is configured to evict shared cache lines upon context switches. A "context switch," as used herein, generally refers to an event wherein processor 102 switches from executing instructions associated with a first process (e.g., process 104a) to executing instructions associated with a second process (e.g., process 104n). Examples of context switches include an interrupt return (IRET), a far call, a virtual machine (VM) switch, etc. As many cache timing based side-channel attacks rely on a state of shared cache lines remaining persistent during context switches in order to learn information about victim processes, evicting the shared cache lines upon a context switch advantageously mitigates such attacks. Further, implementing solutions consistent with the present disclosure via processor 102 comprising cache logic 108 improves efficiency of the overall system 100. For example, this hardware solution results in lower performance penalties and/or overhead when compared to, for example, software-based solutions.

Figure 2:
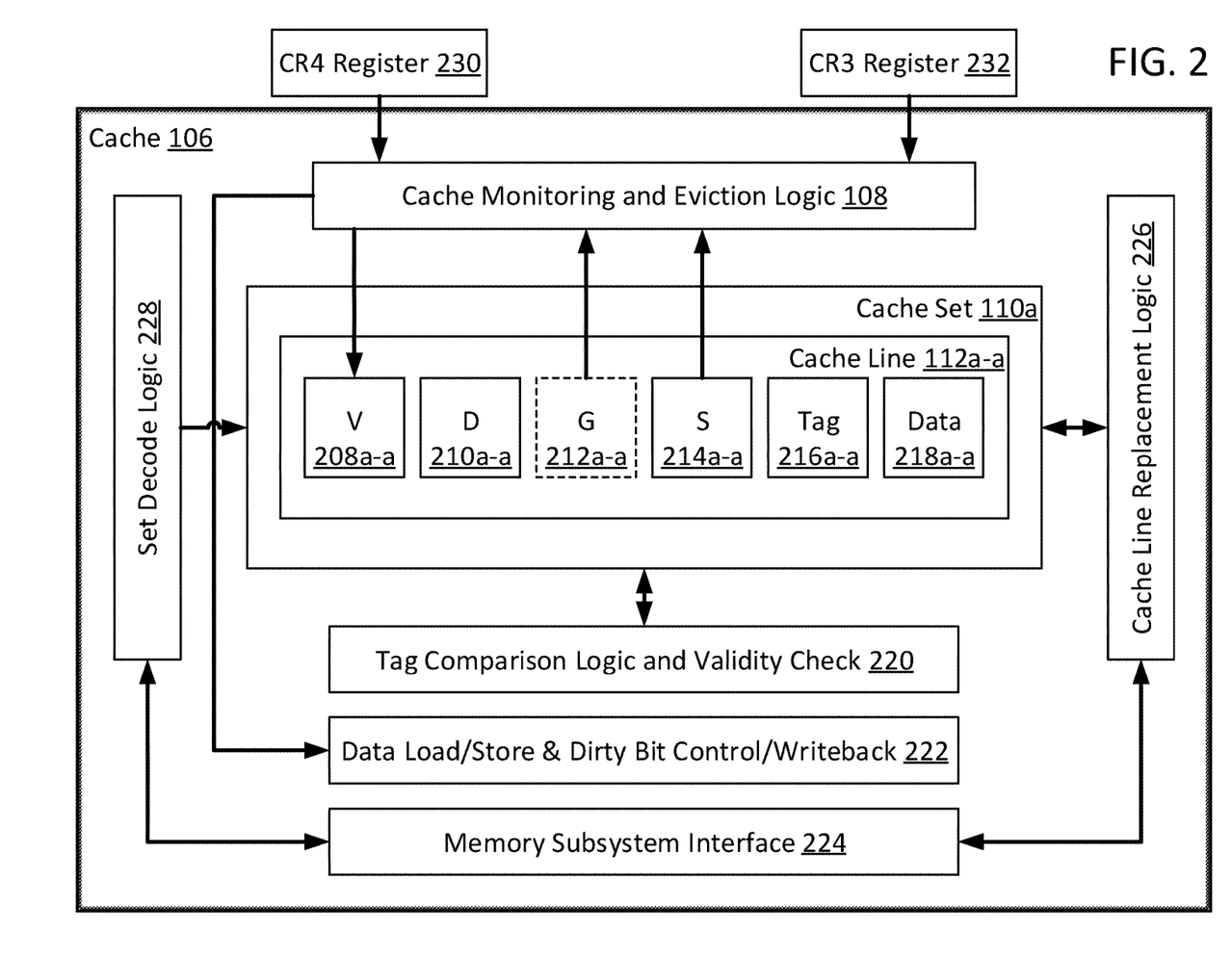
FIG. 2 illustrates an example cache according to several embodiments of the present disclosure.

FIG. 2 illustrates an example cache 106 according to several embodiments of the present disclosure. Cache 106 includes cache monitoring and eviction logic 108 ("cache logic 108"), cache set 110, tag comparison logic and validity check 220, data load/store & dirty bit control/writeback 222, memory subsystem interface 224, cache line replacement logic 226, set decode logic 228, CR4 230 and CR3 232.

Cache set 110a includes cache lines 112a-a-112a-n. While only cache set 110a is depicted in FIG. 2, as described above cache 106 generally includes a plurality of cache sets 110. Similarly, while only cache line 112a-a is depicted in FIG. 2, as described above cache sets 110 each generally include a plurality of cache lines 112.

Cache lines 112 generally include a plurality of fields consisting of one or more bits serving any of a variety of purposes, including "V" bit 208 (indicating whether the cache line is valid; invalid cache lines are generally treated as empty and may thus be overwritten), a "D" bit 210 (indicating whether the cache line is "dirty," i.e., contains data that has been written to the cache line but has not yet been written to memory), a tag field 216 (used to indicate what memory address the cache line corresponds to), and data field 218 (including the actual data stored in the cache line). In embodiments consistent with the present disclosure, cache lines 112 also include "shared" bit S 214 to indicate whether a cache line is shared. As described above, a shared cache line can be written to and accessed by more than one process 104. Cache logic 108 generally determines which cache lines are shared based on corresponding page table entries (PTEs). PTEs of some example systems consistent with the present disclosure additionally include one or more "shared" bits to indicate whether their corresponding addresses are shared. The PTEs may further indicate which processes share the corresponding addresses. An operating system or virtual machine manager, in performing memory management of the system, tracks which addresses are shared and fills the page tables accordingly. Logic 108 determines which cache lines 112 are shared based on the page tables, and sets S bit 214 to represent shared status. In some embodiments, cache lines may include a "G" 212 (indicating that the cache line is "global," e.g., shared by most or possibly all processes and thus should not be flushed).

When a processor (such as processor 102 of FIG. 1) executes instructions associated with a process to fetch data, the processor typically first determines whether the appropriate data is already cached (e.g., within one of cache lines 112). If it is, the data is retrieved. If the requested data is not cached, then the data is retrieved from memory, such as system memory 114. Once the data is retrieved from memory, the processor additionally stores a copy of the data in one of cache lines 112. Processor 102 is generally configured to determine if any cache lines are vacant or unused (e.g., having "V" bit 208 equal to 0) and, if enough cache lines 112 are vacant, to store the copy of the fetched data in the corresponding lines. In doing so, processor 102 is also configured to set the V bit 208 of the corresponding cache lines 112 to 1, in order to indicate that the lines are in use and/or valid.

If insufficient vacant cache lines are present in cache 106, the processor may evict one or more cache lines 112 in order to make room for the newly fetched data. The processor may select the cache lines to evict based upon a cache replacement policy (such as LRU, etc.). Evicting a cache line may comprise setting the V bit 208 of the cache line to "0," marking the cache line as invalid and thus eligible for reuse.

At various times during operation of the computer system, cache 106 may be "flushed." A CLFLUSH operation results in writing contents of one of cache lines 112 to memory 114 (if the associated "dirty" bit is 1) and subsequently invalidating the cache line(s), typically via setting each corresponding V bit 208 to a 0 value. Processes 104 are generally permitted to perform CLFLUSH operations of any or even all cache lines 112 of cache 106. Flushing all or part of cache 106 is often a normal step of computer system operation, but as it sets the cache to a known state, it is also often a first step in various side-channel attacks.

Control register 4 ("CR4") 230 generally comprises a plurality of bits (typically 32 or 64), some of which are reserved. In some embodiments, one or more reserved bits in CR4 230 are generally configured indicate a state of a cache security policy. For example, in some embodiments, a CR4 bit value of 1 may indicate that shared cache line monitoring and detection is to be active, while a CR4 bit value of 0 may indicate that shared cache line monitoring and detection is to be disabled. During operation of computer system 100, CR4 230 is generally controlled by system software and monitored by logic 108. In some embodiments, the reserved bit(s) of CR4 230 may be modified. For example, a reserved bit of CR4 230 may be set to 1 by default on system startup, but may be set to 0 at a later time during operation (e.g., by a user of computer system 100). Of course, various other possible configurations exist. For example, a reserved bit of CR4 230 may be set to 0 by default or may be set by an original equipment manufacturer (OEM) of, e.g., processor 102, etc. In some embodiments, CR4 230 may be automatically modified depending upon any of several factors such as, for example, resource utilization of computer system 100, attributes of a currently-executing process 104, etc.

In some embodiments, a plurality of bits of CR4 230 may enable more possible settings. As a non-limiting example, 2 bits of CR4 230 may enable additional policy settings such as monitoring and labeling shared cache lines but not evicting shared cache lines upon context switches (e.g., CR4[10:9]==10), evicting shared cache lines only when detecting a specific kind of context switches (e.g., CR4[10:9]==01), evicting all shared cache lines upon detection of any context switch (e.g., CR4[10:9]==11), or not monitoring or invalidating shared cache lines at all (e.g., CR4[10:9]==00). Other policies may include, for example, evicting cache lines (shared or not) at random. While the examples described herein refer to bits 9 and 10 of CR4 230, other bits of CR4 230 may be used.

Control register 3 ("CR3") 232 generally indicates a base address of a page table structure corresponding to a process (e.g., which of processes 104 is currently being executed by processor 102). In general, a change in a value stored in CR3 232 is one of several possible indications of a context switch. CR3 may be dynamically updated whenever processor 102 executes instructions associated with one of processes 104. In some embodiments, if shared cache line detection is active (e.g., CR4[9]==1), then upon detection of a context switch, shared cache lines are invalidated, advantageously mitigating or impeding several possible side-channel attacks.

Figure 3:
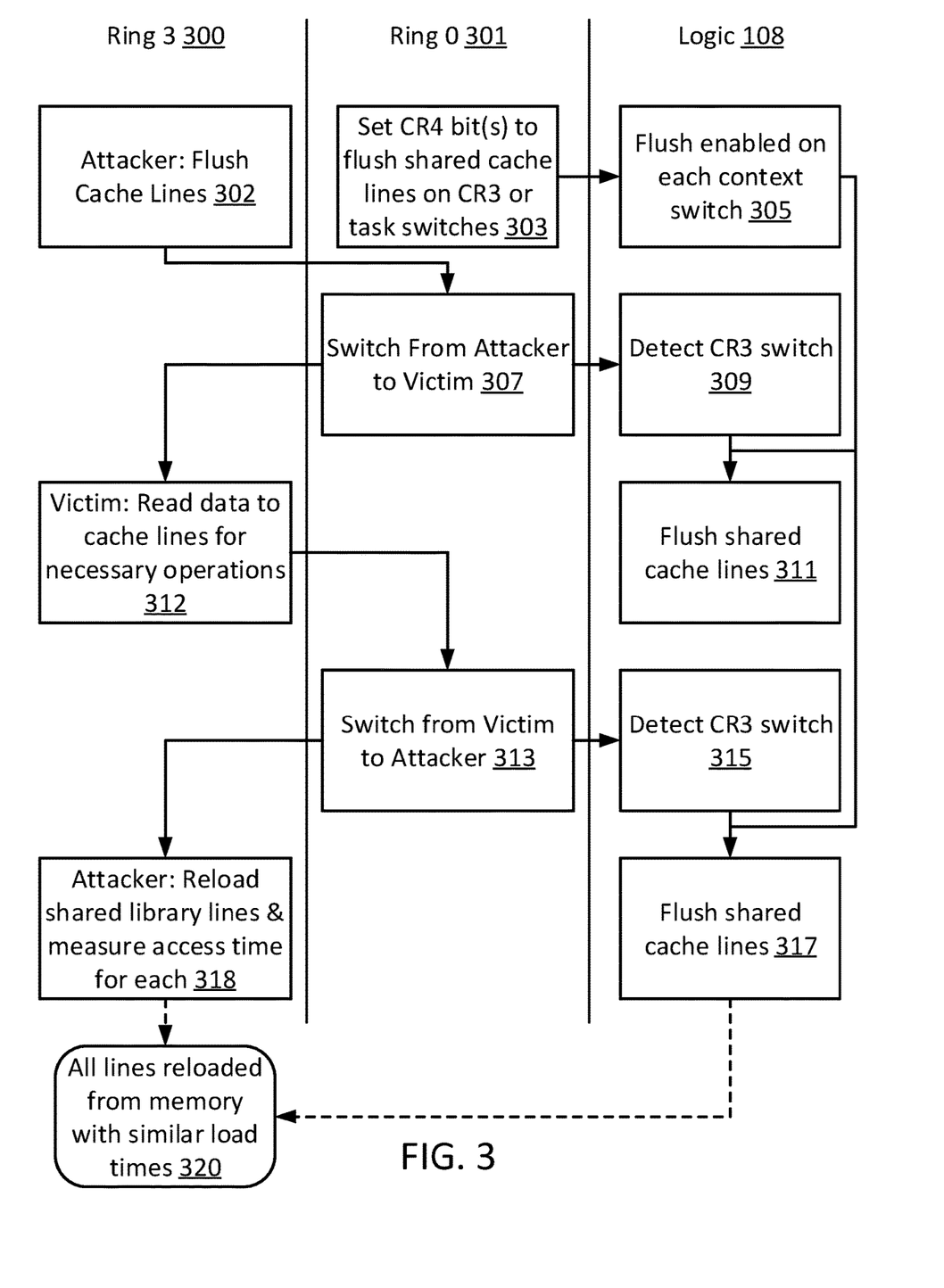
FIG. 3 illustrates operations according to one embodiment of the present disclosure.

FIG. 3 illustrates operations according to one embodiment of the present disclosure. Operations according to this embodiment may be performed by various processes or applications executing at different privilege levels, including a lowest-privilege user level Ring 3 300 and a highest-privilege Ring 0 301, of a computer system (e.g., computer system 100). Some operations according to this embodiment are performed by logic 108.

At operation 302, an attacker (or "spy") process instructs a processor to flush a cache of the computer system, possibly attempting to set the cache to a known state. This may be a part of a FLUSH+RELOAD or FLUSH+FLUSH (or other) side-channel attack.

Operations according to this embodiment further include an operating system (OS) or virtual machine manager (VMM) setting one or more CR4 bits to indicate that a security policy is active 303. This may be performed in Ring 0 301 by, for example, an OS or VMM of computer system 100. This may be as a result of a heuristics check determining that a side-channel attack is likely occurring, which may include monitoring and comparing several memory access statistics to determine whether a side-channel attack may be occurring. For example, traits such as frequency of flush operations, number of cache misses, identity of processes performing the flushes or cache misses, content of lines that are being reloaded, etc. may all be considered in determining whether a cache side-channel attack may be occurring. The CR4 bit indicating that a security policy is active results in cache monitoring and eviction logic 108 flushing shared cache lines on context switches 305.

Operations further include switching from executing instructions associated with the attacker process to executing instructions associated with a victim process 307. This is generally performed by Ring 0 software such as an OS of computer system 100. Switching in this manner results in a change in CR3, which is detected by logic 108 at operation 309. According to the policy indicated by CR4, operations further include flushing shared cache lines 311. This is generally performed by logic 108 as described herein.

Operations additionally include the victim process reading data and performing various operations 312. This may include any typical execution of a Ring 3 application or process as will be appreciated by one skilled in the art. Operations further include switching from executing instructions associated with the victim process back to executing instructions associated with the attacker process 313. This may be performed by Ring 0 software such as an OS or VMM of computer system 100. Once again, this will result in a CR3 switch, detected by logic 108 at 315. In accordance with the security policy outlined by CR4, operations further include flushing shared cache lines 317. This may similarly be performed by logic 108 as described herein. Thus, when operations further include the attacker process reloading shared cache lines and measuring the access time for each 318, the load times will be similar as all of them will be loaded from memory 320, advantageously impeding the attacker process.

Figure 4:
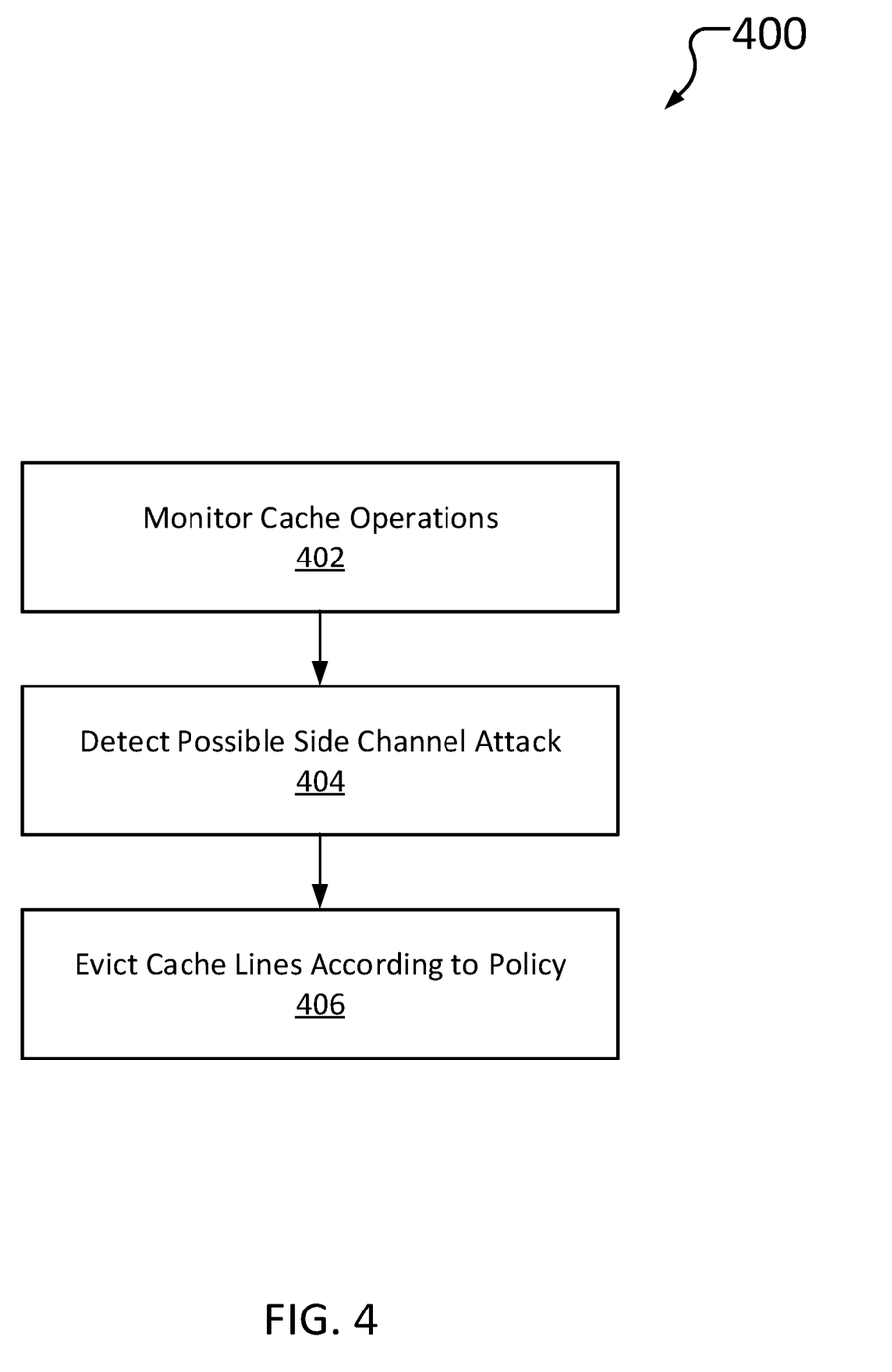
FIG. 4 illustrates operations according to one embodiment of the present disclosure.

FIG. 4 illustrates operations 400 according to at least one embodiment of the present disclosure. Operations according to this embodiment include monitoring cache operations 402. This may include, for example, cache monitoring and eviction logic 108 performing heuristic checks of memory access patterns. This may also include tracking/labeling or otherwise monitoring shared cache lines. Operations further include detecting a possible cache-timing side-channel attack is likely being attempted 404. Operations also include evicting one or more cache lines according to a security policy 406. This may include, for example, evicting shared cache lines, evicting a plurality of cache lines at random, evicting a certain number of most recently used cache lines, evicting all cache lines used within a certain time frame, or simply evicting all cache lines of the entire cache.

Figure 5:
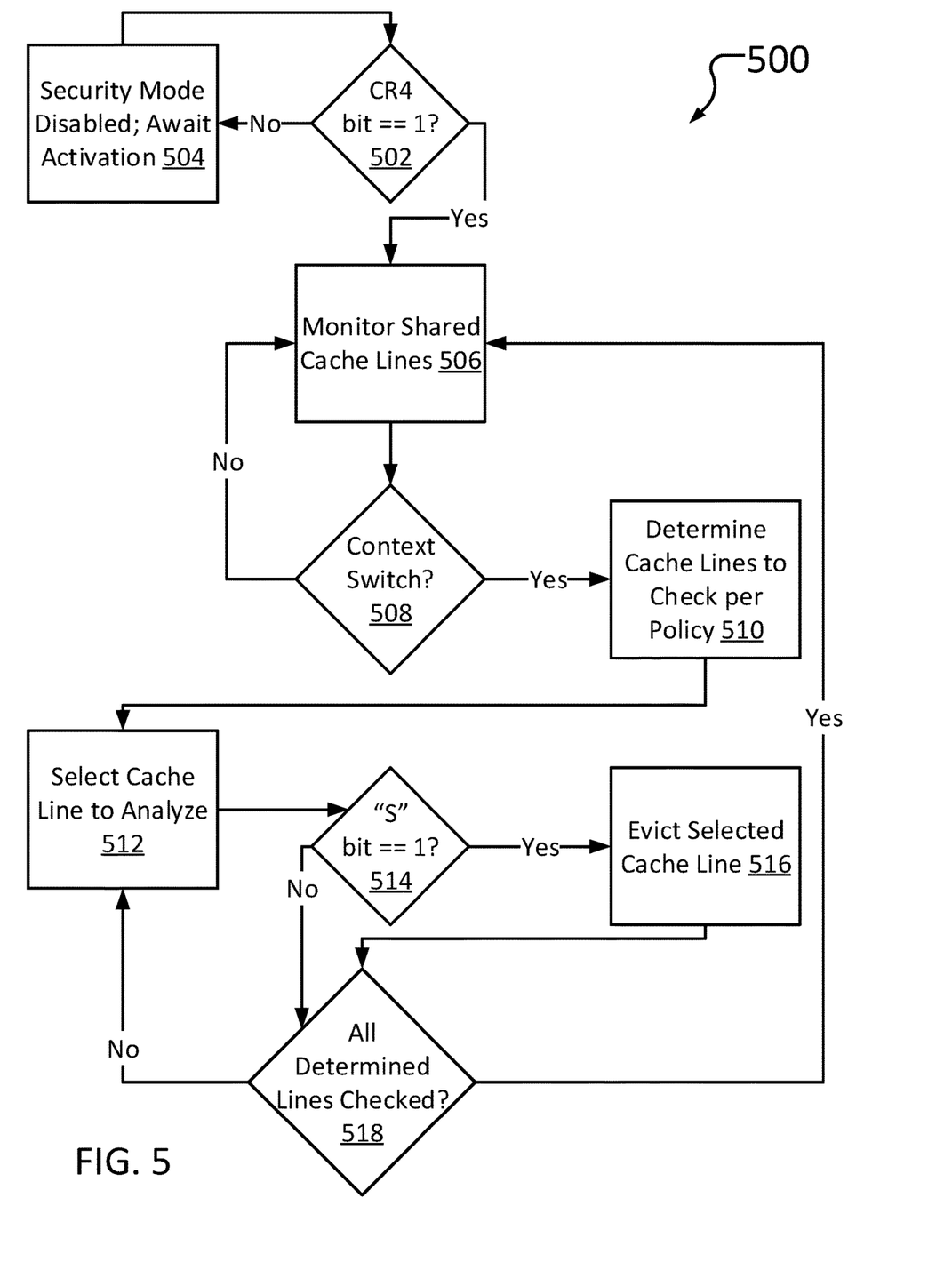
FIG. 5 illustrates operations according to one embodiment of the present disclosure.

FIG. 5 illustrates operations 500 according to one embodiment of the present disclosure. Operations according to this embodiment include determining whether a CR4 bit is equal to 1 502. If the CR4 bit is not equal to 1 (502 "No"), operations further include awaiting activation of a security mode 504. If the CR4 bit is equal to 1 (502 "Yes"), then a system enters security mode and operations include monitoring shared cache lines and monitoring for a context switch 506. This may include, for example, cache monitoring and eviction logic 108 setting S bit 214 of cache lines 112 of cache 106 to "1" for cache lines that are shared.

Operations additionally include monitoring for/determining whether a context switch has occurred 508. As described above, a context switch may comprise a task change, a change in a CR3 232, etc. If a context switch has not occurred (508 "No"), operations include continuing to monitor shared cache lines 506. Once a context switch occurs (508 "Yes"), operations further include determining cache lines to check per a policy 510. For example, this may be performed by logic 108. The policy may govern whether logic 108 analyzes all cache lines, a predetermined subset of cache lines, a number of most recently used cache lines, all cache lines used within a certain time period, etc.

Operations further include iterating through the cache lines, such as selecting a cache line to analyze 512. Operations additionally include determining whether an "S" bit of the selected cache line is equal to 1 514. This "S" bit generally indicates whether the selected cache line is shared. If the cache line is shared (514 "Yes"), operations further include evicting the selected cache line 516, then proceed to determining whether all cache lines that need to be checked per the policy have been checked 518. If the cache line is not shared (514 "No"), the cache line is not evicted and operations proceed to 518. If not all necessary cache lines have been checked (518 "No"), operations proceed to selecting another cache line to analyze 512. This may typically include iterating through a group of cache lines outlined by the policy. If all cache lines that need to be checked have been (518 "Yes"), shared cache lines have been evicted in accordance with the policy so operations proceed to resuming normal monitoring of shared cache lines 506, awaiting another context switch 508, etc.

Figure 6:
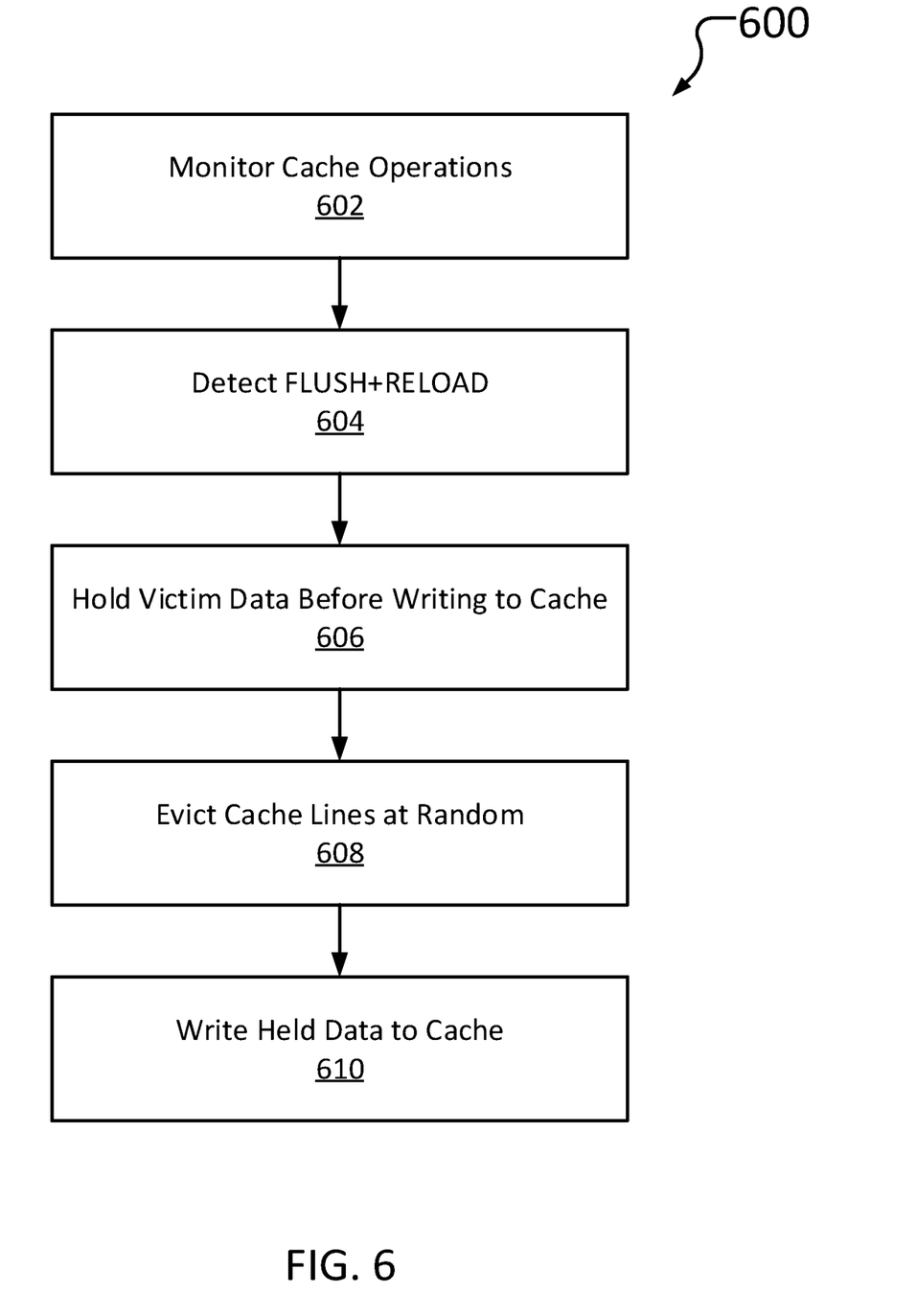
FIG. 6 illustrates operations according to one embodiment of the present disclosure.

FIG. 6 illustrates operations 600 according to one embodiment of the present disclosure. Operations according to this embodiment include monitoring cache operations 602. This may be performed by cache monitoring and eviction logic 108, similar to 402 of FIG. 4. Operations 600 further include detecting a FLUSH+RELOAD attack 604. This may include, for example, logic 108 determining that a process has flushed trusted data from the cache and subsequently reloaded all (or a significant portion) of the flushed lines. Logic 108 may determine that a process has flushed trusted data by receiving information from an OS or VMM of computer system 100 (e.g., a tagged page may indicate that operations are associated with a trusted entity). Operations further include holding victim data before writing it to cache 606. For example, after detecting the FLUSH+RELOAD, a victim process may attempt to reload its own trusted data that was evicted by the attacker process. As this may enable the attacker process to complete the side-channel attack, cache monitoring and eviction logic 108 may hold or otherwise temporarily store the victim's data. The data may be held in temporary storage on included within logic 108.

Operations additional include evicting cache lines at random 608. This generally includes evicting one or more cache lines from one or more sets. This advantageously makes the detected FLUSH+RELOAD attack less effective, and in some cases completely mitigates the attack. The cache lines may be selected based on a random number generator (RNG), such as, for example, a Digital Random Number Generator (DRNG) provided on some Intel processors. The number of cache lines to be evicted may vary depending upon several factors. In general, as logic 108 evicts more cache lines, the FLUSH+RELOAD attack is increasingly likely to be thwarted. However, evicting cache lines typically results in increasing performance overhead. Thus, logic 108 may be configured (by, for example, an OEM) to evict a predetermined number of lines. In some embodiments, logic 108 may evict a random subset of shared lines. In the same or other embodiments, logic 108 may evict at least one cache line from each cache set. Once cache lines are evicted, operations continue with writing the held data to cache 610.

As discussed above, an attacker process attempting a timing attack generally must know why a cache operation resulted in a hit or a miss. Put differently, the success of a cache timing side-channel attack relies on an assumption that all changes made to the cache are made by a victim process (or by the attacker). This is typically accomplished by setting the cache into a known state, allowing a victim process to execute briefly, and then probing the cache to determine which cache lines have been affected. This generally requires or assumes that an attacker process has some knowledge or control over scheduling in computer system 100. If writes by the victim process are the only possible explanation for detected changes to the cache, the attacker is able to glean information about the victim process when probing the cache. Thus, evicting some cache lines at random eliminates the attacker's ability to determine which cache lines were affected by the victim process; the attacker is unable to determine whether a cache miss is due to an intervening victim process cache load or a random eviction, and therefore the underlying assumption is invalidated.

In embodiments where cache lines are evicted at random (such as operations 600 of FIG. 6), tracking of shared cache lines may be unnecessary and caches consistent with said embodiments may not need "S" bit 214. However, in some embodiments both shared line and random line eviction policies are supported, which would necessarily require the "S" bit 214 in cache 106. In these embodiments, the eviction policy may be stored (e.g., in processor memory, in memory 114, in basic input/output system (BIOS) memory, etc.). The current policy may be indicated in CR4 230 and may be changed by, for example, a user. Processor 102 may also change the policy automatically depending upon any of a plurality of factors, including, for example, throughput/ overhead requirements (may be preconfigured, may be reported or updated by an operating system, etc.), confidence in detection of a side-channel attack (higher confidence may bias a system towards evicting all shared cache lines, while lower confidence may result in random line eviction), etc.

Operations for the embodiments have been described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for preventing or mitigating the effects of a cache-timing based side-channel attack, such as a FLUSH-RE-LOAD attack. Cache lines include an additional bit indicating whether or not the line is "shared." In response to a context switch, shared cache lines are evicted based upon these "shared" bits.

The terms and expressions which have been employed herein are used as terms of description and not of limitation, and there is no intention in the use of such terms and expressions of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in any embodiment herein, the term "logic" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), system on-chip (SoC), desktop computers, laptop computers, tablet computers, servers, smartphones, etc.

The following examples pertain to further embodiments. The following examples of the present disclosure may comprise subject material such as at least one device, a method, at least one machine-readable medium for storing instructions that when executed cause a machine to perform acts based on the method and/or means for performing acts based on the method.

According to example 1, there is provided a computing system. The computing system may comprise memory circuitry, processor circuitry to execute instructions associated with a plurality of processes, the processor circuitry having at least a cache, the cache including at least a plurality of cache lines to store information from the memory circuitry, each cache line including one or more S bits to indicate whether the corresponding cache line is shared between two or more of the plurality of processes, and cache monitoring and eviction logic to determine, based on the S bits, a subset of the plurality of cache lines, the subset of cache lines consisting of shared cache lines, determine whether a context switch has occurred, and, responsive to a determination that a context switch has occurred, evict one or more of the subset of cache lines.

Example 2 may include the elements of example 1, wherein the processor circuitry is to execute instructions to set one or more page S bits in a page table entry, and the S bits of the cache lines are based on the page S bits.

Example 3 may include the elements of any of examples 1-2, wherein the cache further includes a cache security policy register comprising one or more bits to indicate an active cache security policy, and the cache monitoring and eviction logic is further to determine, based on contents of the cache security policy register, which of a plurality of cache security policies is active.

Example 4 may include the elements of example 3, wherein the cache monitoring and eviction logic to, responsive to a determination that a context switch has occurred, evict one or more of the subset of cache lines comprises cache monitoring and eviction logic to, responsive to a determination that a context switch has occurred, select, based on the active security policy, one or more of the subset of cache lines to evict, and evict the selected cache lines.

Example 5 may include the elements of example 4, wherein the cache monitoring and eviction logic is further to, responsive to a determination that a first security policy is active, select all of the subset of cache lines.

Example 6 may include the elements of any of examples 4-5, wherein the cache monitoring and eviction logic is further to, responsive to a determination that a second security policy is active, select one or more of the subset of cache lines based on an output of a random number generator.

Example 7 may include the elements of any of examples 4-6, wherein the cache monitoring and eviction logic is further to monitor memory access patterns associated with the plurality of processes, determine, based at least on the memory access patterns, a likelihood that a side-channel attack is occurring, and modify the contents of the cache security policy register based on the likelihood of a side-channel attack occurring.

Example 8 may include the elements of any of examples 1-7, wherein the context switch comprises at least one of an interrupt return (IRET), a far call, a task switch, a change in a control register of the cache, and a virtual machine (VM) schedule switch.

According to example 9 there is provided a method. The method may comprise monitoring, via cache monitoring and eviction logic, a plurality of cache lines of a cache of a processor, determining, via the cache monitoring and eviction logic based on one or more "S" bits of the cache lines, a subset of the plurality of cache lines, the subset of cache lines consisting of shared cache lines, determining, via the cache monitoring and eviction logic, whether a context switch has occurred, and responsive to a determination that a context switch has occurred, evicting, via the cache monitoring and eviction logic, one or more of the subset of cache lines.

Example 10 may include the elements of example 9, further comprising determining, via the cache monitoring and eviction logic based on contents of a cache security policy register of the cache, which of a plurality of cache security policies is active.

Example 11 may include the elements of example 10, wherein the responsive to a determination that a context switch has occurred, evicting, via the cache monitoring and eviction logic, one or more of the subset of cache lines comprises responsive to a determination that a context switch has occurred selecting, from the subset of cache lines via the cache monitoring and eviction logic based on the active security policy, one or more cache lines to evict, and evicting, via the cache monitoring and eviction logic, the selected cache lines.

Example 12 may include the elements of example 11, further comprising responsive to a determination that a first security policy is active, selecting, via the cache monitoring and eviction logic, all of the subset of cache lines.

Example 13 may include the elements of any of examples 11-12, further comprising responsive to a determination that a second security policy is active, selecting, via the cache monitoring and eviction logic, one or more cache lines from the subset of cache lines based on an output of a random number generator.

Example 14 may include the elements of any of examples 11-13, further comprising monitoring, via the cache monitoring and eviction logic, memory access patterns associated with a plurality of processes, determining, via the cache monitoring and eviction logic based at least on the memory access patterns, a likelihood that a side-channel attack is occurring, and modifying, via the cache monitoring and eviction logic, the contents of the cache security policy register based on the likelihood of a side-channel attack occurring.

According to example 15 there is provided a system including at least one device, the system being arranged to perform the method of any of the above examples 9-14.

According to example 16 there is provided a chipset arranged to perform the method of any of the above examples 9-14.

According to example 17 there is provided at least one machine readable storage device have a plurality of instructions stored thereon which, when executed on a computing device, cause the computing device to carry out the method according to any of the above examples 9-14.

According to example 18 there is provided a computing system. The computing system may comprise memory circuitry, processor circuitry to execute instructions associated with a plurality of processes, the processor circuitry having at least a cache including at least a plurality of cache lines to store information from the memory circuitry, and cache monitoring and eviction logic to monitor memory access patterns associated with the plurality of processes, determine, based at least on the memory access patterns, a likelihood that a side-channel attack is occurring, and responsive to a determination that the likelihood of a side-channel attack occurring is above a threshold, evict one or more of the cache lines.

Example 19 may include the elements of example 18, wherein the memory access patterns include at least a number of CLFLUSH operations, a number of cache hits, a number of cache misses, a relationship between the number of cache hits and the number of cache misses.

Example 20 may include the elements of example 19, wherein the instructions which, when executed by the processor, result in the operations responsive to a determination that a context switch has occurred, evict one or more of the subset of cache lines comprise instructions which, when executed by the processor, result in operations comprising responsive to a determination that a context switch has occurred, select, based on the active security policy, one or more cache lines from the subset of cache lines to evict, and evict the selected cache lines.

Example 21 may include the elements of any examples 19-20, wherein each cache line includes one or more "S" bits to indicate whether the corresponding cache line is shared by two or more of the plurality of processes, and the cache monitoring and eviction logic to, responsive to the determination that the likelihood of a side-channel attack occurring is above the threshold, evict one or more of the cache lines comprises cache monitoring and eviction logic to determine, based on the S bits, which of the plurality of cache lines are shared cache lines, and responsive to the determination that the likelihood of a side-channel attack occurring is above the threshold, evict one or more of the shared cache lines.

Example 22 may include the elements of any of examples 19-21, wherein the cache monitoring and eviction logic to, responsive to the determination that the likelihood of a side-channel attack occurring is above the threshold, evict one or more of the cache lines comprises cache monitoring and eviction logic to, responsive to the determination that the likelihood of a side-channel attack occurring is above the threshold, select, using a random number generator, one or more cache lines to evict, and evict the selected cache lines.

Example 23 may include the elements of any of examples 19-22, wherein the cache monitoring and eviction logic to, responsive to the determination that the likelihood of a side-channel attack occurring is above the threshold, evict one or more of the cache lines comprises cache monitoring and eviction logic to, responsive to the determination that the likelihood of a side-channel attack occurring is above the threshold hold cache write instructions, evict one or more of the cache lines, and after evicting the one or more cache lines, cause the held cache write instructions to be executed.

What is claimed:

1. A method, comprising:
   monitoring, via cache monitoring and eviction logic, a plurality of cache lines of a cache of a processor;
   forming, based on one or more S bits, one or more cache line subsets, each of the one or more cache line subsets including a plurality of cache lines shared between a respective one of the plurality of processes and at least one other of the plurality of processes;
   determining, via the cache monitoring and eviction logic, whether a context switch has occurred in at least one of the plurality of processes based on a change in a control register indicating a base address of a page table corresponding to a process currently being executed by the processor circuitry; and
   responsive to the determination that the context switch has occurred, selectively evicting, via the cache monitoring and eviction logic, the plurality of cache lines included in the cache line subset associated with the at least one process in which the context switch has occurred.

2. The method of claim 1, further comprising determining, via the cache monitoring and eviction logic based on contents of a cache security policy register of the cache, which of a plurality of cache security policies is active.

3. The method of claim 2, wherein evicting, via the cache monitoring and eviction logic, the plurality of cache lines comprises:
   responsive to the determination that the context switch has occurred:
      selecting, from the subset of cache lines via the cache monitoring and eviction logic based on the active security policy, one or more cache lines to evict; and
      evicting, via the cache monitoring and eviction logic, the selected cache lines.

4. The method of claim 3, further comprising, responsive to the determination that a first security policy is active, selecting, via the cache monitoring and eviction logic, all of the subset of cache lines.

5. The method of claim 3, further comprising, responsive to the determination that a second security policy is active, selecting, via the cache monitoring and eviction logic, one or more cache lines from the subset of cache lines based on an output of a random number generator.

6. The method of claim 3, further comprising:
   monitoring, via the cache monitoring and eviction logic, memory access patterns associated with the plurality of processes;
   determining, via the cache monitoring and eviction logic based at least on the memory access patterns, a likelihood that a side-channel attack is occurring; and
   modifying, via the cache monitoring and eviction logic, the contents of the cache security policy register based on the determined likelihood of a side-channel attack occurring.

7. One or more non-transitory computer-readable storage devices having stored thereon instructions which, when executed by a processor, result in operations comprising:
   monitor a plurality of cache lines of a cache of the processor;
   forming, based on one or more S bits, one or more cache line subsets, each of the one or more cache line subsets including a plurality of cache lines shared between a respective one of the plurality of processes and at least one other of the plurality of processes;
   determine whether a context switch in at least one of the plurality of processes has occurred based on a change in a control register indicating a base address of a page table corresponding to a process currently being executed by the processor circuitry; and
responsive to the determination that the context switch has occurred, selectively evict the plurality of cache lines included in the cache line subset associated with the at least one process in which the context switch has occurred.

8. The one or more non-transitory computer-readable storage devices of claim 7, wherein the instructions comprise instructions which, when executed by the processor, result in operations comprising:
determine, based on contents of a cache security policy register of the cache, which of a plurality of cache security policies is active.

9. The one or more non-transitory computer-readable storage devices of claim 8, wherein the instructions which, when executed by the processor, result in selectively evicting the plurality of cache lines comprise instructions which, when executed by the processor, result in operations comprising, responsive to the determination that the context switch has occurred:
select, based on the active security policy, one or more cache lines from the subset of cache lines to evict; and
evict the selected cache lines.

10. The one or more non-transitory computer-readable storage devices of claim 9, wherein the instructions comprise instructions which, when executed by the processor, result in operations comprising:
responsive to the determination that a first security policy is active, select all cache lines from the subset of cache lines.

11. The one or more non-transitory computer-readable storage devices of claim 9, wherein the instructions comprise instructions which, when executed by the processor, result in operations comprising:
responsive to the determination that a second security policy is active, select one or more cache lines from the subset of cache lines based on an output of a random number generator.

12. The one or more non-transitory computer-readable storage devices of claim 9, wherein the instructions comprise instructions which, when executed by the processor, result in operations comprising:
monitor memory access patterns associated with the plurality of processes;
determine, based at least on the memory access patterns, a likelihood that a side-channel attack is occurring; and
modify the contents of the cache security policy register based on the determined likelihood of a side-channel attack occurring.

13. A computing system, comprising:
memory circuitry;
processor circuitry to execute instructions associated with a plurality of processes, the processor circuitry having at least a cache, the cache including at least:
a plurality of cache lines to store information from the memory circuitry, each cache line including one or more S bits to indicate whether the corresponding cache line is shared between two or more of the plurality of processes; and
cache monitoring and eviction logic to:
form, based on the S bits, one or more cache line subsets, each of the one or more cache line subsets including a plurality of cache lines shared between a respective one of the plurality of processes and at least one other of the plurality of processes;
determine whether a context switch has occurred in at least one of the plurality of processes based on a change in a control register indicating a base address of a page table corresponding to a process currently being executed by the processor circuitry; and
responsive to the determination that the context switch has occurred, selectively evict the plurality of cache lines included in the cache line subset associated with the at least one process in which the context switch has occurred.

14. The computing system of claim 13, wherein:
the processor circuitry is to execute instructions to set one or more page S bits in a page table entry; and
the S bits of the cache lines are based on the page S bits.

15. The computing system of claim 13, wherein:
the cache further includes a cache security policy register comprising one or more bits to indicate an active cache security policy; and
the cache monitoring and eviction logic is further to determine, based on contents of the cache security policy register, which of a plurality of cache security policies is active.

16. The computing system of claim 15, wherein the cache monitoring and eviction logic to, responsive to a determination that a context switch has occurred, evict one or more of the subset of cache lines comprises cache monitoring and eviction logic to, responsive to a determination that a context switch has occurred:
select, based on the active security policy, one or more of the subset of cache lines to evict; and
evict the selected cache lines.

17. The computing system of claim 16, wherein the cache monitoring and eviction logic is further to, responsive to a determination that a first security policy is active, select all of the subset of cache lines.

18. The computing system of claim 16, wherein the cache monitoring and eviction logic is further to, responsive to a determination that a second security policy is active, select one or more of the subset of cache lines based on an output of a random number generator.

19. The computing system of claim 16, wherein the cache monitoring and eviction logic is further to:
monitor memory access patterns associated with the plurality of processes;
determine, based at least on the memory access patterns, a likelihood that a side-channel attack is occurring; and
modify the contents of the cache security policy register based on the likelihood of a side-channel attack occurring.

20. The computing system of claim 13, wherein the context switch comprises at least one of:
an interrupt return (IRET);
a far call;
a task switch; and
a virtual machine (VM) schedule switch.

21. A computing system, comprising:
memory circuitry;
processor circuitry to execute instructions associated with a plurality of processes, the processor circuitry having at least:
a cache including at least a plurality of cache lines to store information from the memory circuitry; and
cache monitoring and eviction logic to:
monitor memory access patterns associated with the plurality of processes;

form one or more cache line subsets, each of the one or more cache line subsets including a plurality of cache lines shared between a respective one of the plurality of processes and at least one other of the plurality of processes;

determine, based at least on the memory access patterns, a likelihood that a side-channel attack is occurring on at least one of the plurality of processes, wherein the likelihood is based at least in part on whether a change has occurred in a control register indicating a base address of a page table corresponding to a process currently being executed by the processor circuitry; and responsive to a determination that the likelihood of the side-channel attack occurring on the at least one of the plurality of processes is above a threshold, selectively evict the plurality of cache lines included in the cache line subset associated with the at least one process in which the context switch has occurred.

22. The computing system of claim 21, wherein the memory access patterns include at least:
   a number of cache line flush (CLFLUSH) operations;
   a number of cache hits;
   a number of cache misses;
   a relationship between the number of cache hits and the number of cache misses.

23. The computing system of claim 21, wherein:
   each cache line includes one or more "S" bits to indicate whether the corresponding cache line is shared by two or more of the plurality of processes; and
   the cache monitoring and eviction logic to, responsive to the determination that the likelihood of the side-channel attack occurring is above the threshold, selectively evict the plurality of cache lines is to:
      determine, based on the S bits, which of the plurality of cache lines are shared cache lines; and
      responsive to the determination that the likelihood of the side-channel attack occurring is above the threshold, evict one or more of the shared cache lines.

24. The computing system of claim 21, wherein the cache monitoring and eviction logic to, responsive to the determination that the likelihood of a side-channel attack occurring is above the threshold, selectively evict the plurality of cache lines is to, responsive to the determination that the likelihood of a side-channel attack occurring is above the threshold:
   select, using a random number generator, one or more cache lines to evict; and
   evict the selected cache lines.

25. The computing system of claim 21, wherein the cache monitoring and eviction logic to, responsive to the determination that the likelihood of a side-channel attack occurring is above the threshold, selectively evict the plurality of cache lines is to, responsive to the determination that the likelihood of a side-channel attack occurring is above the threshold:
   hold cache write instructions;
   evict one or more of the cache lines; and
   after evicting the one or more cache lines, cause the held cache write instructions to be executed.

* * * * *